United States Patent
Adriaans et al.

(10) Patent No.: US 6,393,387 B1
(45) Date of Patent: *May 21, 2002

(54) SYSTEM AND METHOD FOR MODEL MINING COMPLEX INFORMATION TECHNOLOGY SYSTEMS

(75) Inventors: Pieter Willem Adriaans, Kockengen; Arno Jan Knobbe, Houten; Marc Gathier, Nieuwegein, all of (NL)

(73) Assignee: Perot Systems Corporation, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,394
(22) Filed: Mar. 6, 1998
(51) Int. Cl.[7] ............................................. G06F 15/173
(52) U.S. Cl. ....................... 703/27; 706/14; 709/224; 709/229; 709/234; 700/28
(58) Field of Search ................. 395/500.34, 500.38, 395/500.42, 500.46, 183.01, 183.02, 200.53, 680, 500.49; 709/6, 101, 223, 224, 234, 235; 704/237; 370/230; 700/28, 29, 30

(56) References Cited

U.S. PATENT DOCUMENTS

| | | | |
|---|---|---|---|
| 5,668,944 A | 9/1977 | Berry | 395/184.01 |
| 4,825,195 A | 4/1989 | Berruyer | 340/501 |
| 5,461,628 A | 10/1995 | Nakamura | 371/20.1 |
| 5,469,463 A | 11/1995 | Polich et al. | 395/182.18 |
| 5,847,131 A | 1/1996 | Kassatly et al. | 395/62 |
| 5,528,516 A | 6/1996 | Yemini et al. | 364/551.01 |
| 5,568,471 A | 10/1996 | Hershey et al. | 370/17 |
| 5,612,949 A | 3/1997 | Bennett | 370/253 |
| 5,615,341 A * | 3/1997 | Agrawal et al. | 395/210 |
| 5,661,668 A * | 8/1997 | Yemini et al. | 364/550 |
| 5,704,017 A * | 12/1997 | Heckerman et al. | 395/61 |

(List continued on next page.)

FOREIGN PATENT DOCUMENTS

WO    WO 96 00419 A    4/1996

OTHER PUBLICATIONS

Raul Velez, Du Zhang and James Kho,by Raul Velez, Du Zhang and James Kho, An Intelligent Tool for Unix Performance Tuning, Proceedings of the 1993 IEEE International Conference on Tools with Artificial Intelligence, TAI, 1993; Boston MA.; Conf. No. 5, Nov. 8–11, pp. 118–122, XP000436431.

A.J. Knobbe. Data Mining for Adaptive System Management, Proceedings of the First International Conference on the Practical Application of Knowledge Discovery and Data Mining, PADD, 1997; Apr. 23–25, 1997, pp. 157–165, XP002105193.

Syllogic White Paper; Adaptive Systems Management, Version 2.1, Jan. 1998, pp. 1–14; Retrieved from Internet; Jun. 2, 1999; XP002105194.

*Primary Examiner*—Kevin J. Teska
*Assistant Examiner*—Thai Phan
(74) *Attorney, Agent, or Firm*—Jenkens & Gilchrist P.C.

(57) ABSTRACT

A system and method for automatically creating causal association models of complex information technology (IT) systems. System components and elements are subject to periodic monitoring associated with performance thresholds. Numerical data indicating component state information is converted to Boolean attributes by use of defined or discovered thresholds. Resulting data is accumulated and data mined for component relations within the IT system using association rules induction methods. Models of the system may then be adapted with results generated from the analysis to accurately reflect causal relations among various system components.

55 Claims, 2 Drawing Sheets

U.S. PATENT DOCUMENTS

| | | | |
|---|---|---|---|
| 5,715,432 A | | 3/1998 | Xu .............................. 395/500 |
| 5,724,573 A | * | 3/1998 | Agrawal et al. .............. 395/68 |
| 5,748,098 A | * | 5/1998 | Grace ..................... 340/825.16 |
| 5,802,254 A | * | 9/1998 | Satou et al. ................... 707/2 |
| 5,812,997 A | * | 9/1998 | Morimoto et al. ............. 707/6 |
| 5,832,482 A | * | 11/1998 | Yu et al. ....................... 706/12 |
| 5,897,627 A | * | 4/1999 | Leivian et al. |
| 6,311,175 B1 | * | 10/2001 | Adriaans et al. |

* cited by examiner

SYSTEM AND METHOD FOR MODEL MINING COMPLEX INFORMATION TECHNOLOGY SYSTEMS

BACKGROUND OF THE INVENTION

1. Technical Field of the Invention

The present invention relates to complex information technology systems (IT) and, in particular, to a system and method for discovering relations between components in a complex IT system, and more particularly, to techniques for iteratively determining IT system component associations.

2. Background and Object of the Invention

With the exponential growth of the computer and the computer industry, information technology (IT) systems have become increasingly complex and difficult to manage. A typical IT system in even a small company may contain dozens of computers, printers, servers, databases, etc., each component in some way connected to the others across the interlinkage. A simplified example of an interconnected IT system is shown in FIG. 1, described in more detail hereinafter.

Figure 1:
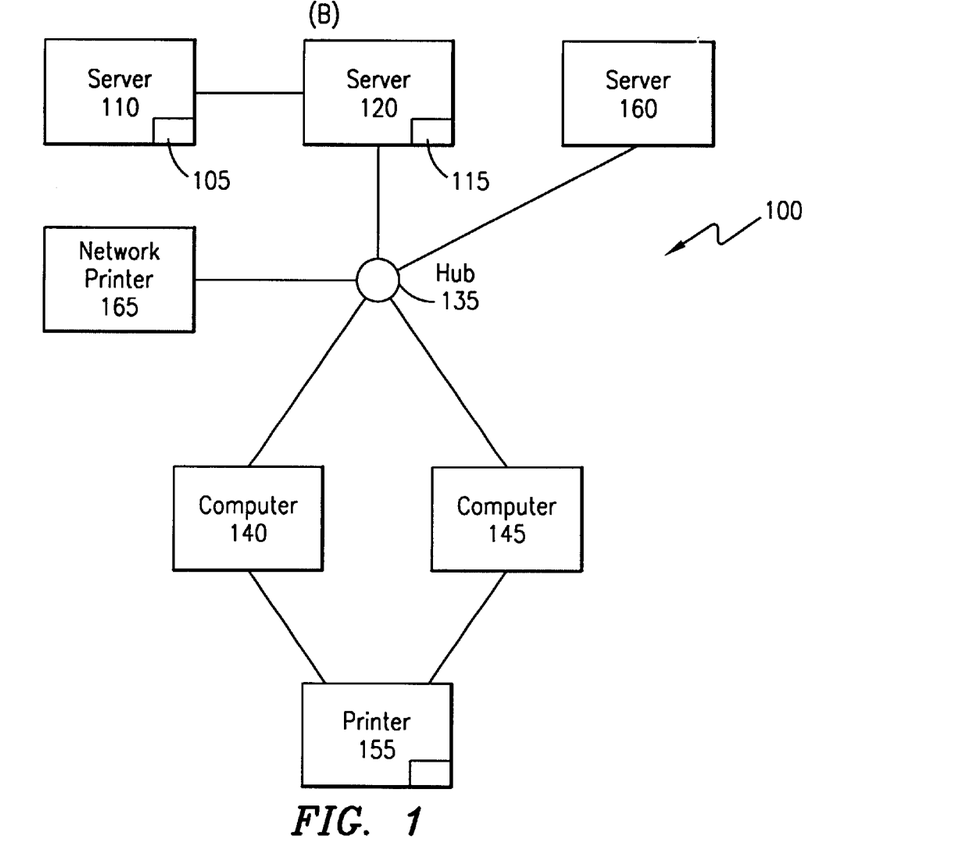
FIG. 1 is an exemplary network system upon which the system and method of the present invention may be employed.

Although interconnected systems, such as the one shown in FIG. 1, offer many advantages to the users, e.g., resource sharing, as such systems grow and the number of component interlinkages increase, the behavior of these complex systems becomes more difficult to predict. Further, system performance begins to lag or becomes inconsistent, even becoming chaotic in nature. The addition or removal of one component, even seemingly minor, could have dramatic consequences on the performance of the whole system. Even an upgrade on one component could adversely affect a distant, seemingly unrelated component. The system and method of the present invention is directed to techniques to better predict the behavior of complex IT systems, offering system administrators the opportunity to identify problem areas such as performance bottlenecks and to correct them prior to a system or component failure.

Conventional approaches to system performance monitoring are inadequate to easily divine the nature of a performance problem in a complex IT system since any data collected in monitoring is generally useless in ascertaining the true nature of the performance difficulty. The system and method of the present invention, however, provide a mechanism whereby system monitoring data is made easily accessible and usable for analyzing current performance and predicting future performance. The present invention facilitates this analysis through use of data mining principles discussed further hereinafter.

In general, data mining is an analysis of data in a database using tools which determine trends or patterns of event occurrences without knowledge of the meaning of the analyzed data. Such analysis may reveal strategic information that is hidden in vast amounts of data stored in a database. Typically, data mining is used when the quantity of information being analyzed is very large, when variables of interest are influenced by complicated relations to other variables, when the importance of the variable varies with its own value, or when the importance of variables vary with respect to time. In situations such as these, traditional statistical analysis techniques or common database management systems may fail or become unduly cumbersome.

Every year, companies compile large volumes of information in databases further straining the capabilities of traditional data analysis techniques. These increasingly growing databases contain valuable information on many facets of the companies' business operations, including trend information which may only be gleaned by a critical analysis of key data interspersed across the database(s). Unfortunately, because of the sheer volume and/or complexity of the available information, such trend information is typically lost as it is unrecoverable by manual interpretation methods or traditional information management systems. The principles of data mining, however, may be employed as a tool to discover this hidden trend information buried within the pile of total information available.

Such data mining techniques are being increasingly utilized in a number of fields, including banking, marketing, biomedical applications and a number of other industries. Insurance companies and banks have used data mining for risk analysis, for example, using data mining methods in investigating its own claims databases for relations between client characteristics and corresponding claims. Insurance companies have obvious interest in the characteristics of their policy holders, particularly those exhibiting risky or otherwise inappropriate activities or behaviors adverse to the companies' interests, and with such analyses, are able to determine risk-profiles and adjust premiums commensurate with the determined risk.

Data mining has also found great success in direct marketing strategies. Direct marketing firms are able to determine relationships between personal attributes, such as age, gender, locality, income, and the likelihood that a person will respond to, for instance, a particular direct mailing. These relationships may then be used to direct mailing towards persons with the greatest probability of responding, thus enhancing the companies' prospects and potential profits. In utilizing data mining techniques, the company mails X number of direct marketing sales proposals. Out of these mailing, a percentage Y reply. Data mining techniques are then applied to a database containing biographical information on all persons to whom mailings were directed. Relational factors between those that did and did not respond may be determined. The result is a subgroup of the original database with mailing targets that have demonstrated a greater probability of responding. This subgroup could be, for example, middle-aged, dual-income families with one child. Future mailings could be directed towards families fitting this biographical data. Responses from these familial groups could then be further data mined in relation to the original group to refine the analysis. A process such as this could be repeated indefinitely, where changes in behaviors of targeted groups would be recovered over time through increased amounts of data that is analyzed and with repeated analysis. In this sense, the data mining analysis 'learns' from each repeated result. In this example, data mining is used to predict the behavior of customers based on historical analysis of their behavior.

In the same manner demonstrated hereinabove, data mining may also be employed in predicting the behavior of the components of a complex information technology (IT) system. Similar approaches with appropriate modifications can be used to determine how interconnected components influence each other and for uncovering complex relations that exist throughout the IT system.

As discussed, multiple applications will be operated within a common IT infrastructure, such as the one shown in FIG. 1. Often, these applications will utilize some of the same resources. It is obvious that sharing of IT infrastructure resources among different applications may cause unexpected interactions or system behavior and often such unexpected interactions, being non-synergist are undesirable in nature. An example would be multiple business applications sharing a router within an IT system. As illustrated, a particular application, e.g., an E-mail service, burdens a router in such a way that other applications do not function well. In this example, it is reasonable to expect numerous applications to, at times, share usage of the router. Traditional systems management techniques may prove difficult in determining which specific application is causing loss of system performance. This example explains why the need to find hidden relationships among IT system components and applications running in such environments exist. By way of solving the problem in the previous example, it may be necessary to reroute E-mail traffic through another router to obtain adequate performance for the other applications.

Figure 2:
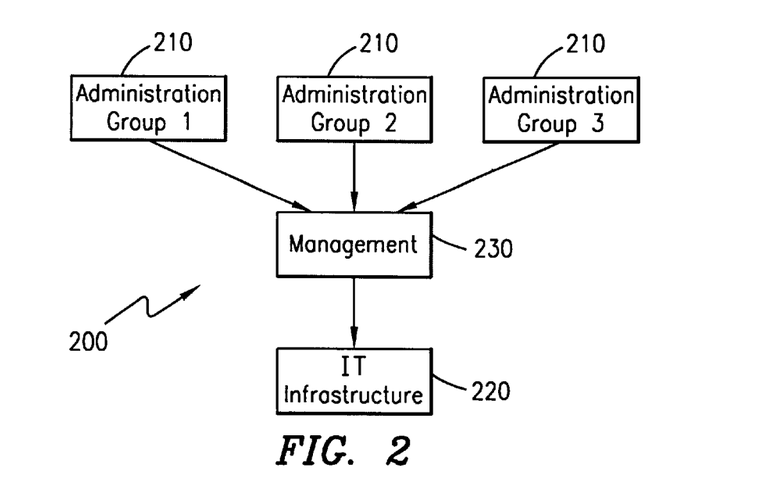
FIG. 2 is a block diagram of a traditional IT systems management method.

Traditional IT system management is now generally defined as including all the tasks that have to be performed to ensure the capability of the IT infrastructure of an organization to meet user requirements. Shown in FIG. 2 is a traditional IT systems management model, generally designated by the reference numeral 200. Essentially, there are groups of system administrators 210 having knowledge of the IT infrastructure, such as the one shown in FIG. 1 hereinafter and generally designated herein by reference numeral 220, which they are managing. Typically, the knowledge of the infrastructure 220 is scattered among the various personnel comprising the system administrator group 210. The total of this knowledge is limited to the sum of the individual administrators' knowledge, where invariably there is a great deal of redundancy of knowledge. This redundancy may be considered an inefficiency of the overall knowledge base. In other words, a theoretical maximum knowledge of the infrastructure 220 would be realized only when each individual administrator of the administration group 210 had knowledge that was unique to that specific administrator. While this may appear to be an ambiguous analysis of the effectiveness of the group, it is of real consequence for the company that must finance a group of administrators. Furthermore, this knowledge is typically not stored in an easily retrievable electronic form.

When system monitoring is included in the aforementioned traditional management system, this monitoring is usually limited to real time data, such as the current system load and the like. An administrator may observe such reporting of real time data, and if system loads or events being monitored are noticed to be consistent with loads that the administrator recognizes to be associated with impending system malfunction or loss of performance, that administrator may redirect part of the load through alternative subsystems of the IT infrastructure.

Often, such real time data reporting may be used in coordination with a system model of the IT system, of which data is being collected and reported. The model usually includes a computer algorithm that utilizes code governing the relations among various system devices. A problem with such models, however, is that the relations used in modeling the system account only for expected interactions among components and subsystems. The model is, therefore, merely an idealized model of the actual system. Hidden or unexpected relations that exist between components would not be accounted for. Furthermore, as the infrastructure 220 is modified, the model must be manually altered to include new relations in the model algorithm to account for the changes made.

An improvement over this traditional management system is realized in the so-called expert system. An expert system is a form of artificial intelligence in which a computer program containing a database, frequently referred to as a knowledge base, and a number of algorithms used to extrapolate facts from the programmed knowledge and new data that is input into the system. The knowledge base is a compilation of human expertise used to aid in solving problems, e.g., in medical diagnosis. The utility of the expert system is, however, limited to the quality of the data and algorithms that are input into the system by the human expert.

Typically, expert systems are developed so that knowledge may be accumulated from a person or persons skilled in a specific area of technology and stored in an easily retrievable media. This way, persons less skilled than the experts, whose knowledge was accumulated within the expert system, have access to such expert information. In this manner, a company may save human and financial resources by having less skilled personnel access such expert systems instead of requiring the expert to handle all of such situations requiring a certain level of knowledge.

Utilization of such expert systems allows less skilled persons to also analyze IT systems behavior. These systems may be used to aid in troubleshooting faults in an IT system or they may be used to assist in predicting such faults with the assistance of system performance monitors, i.e., a person with access to an expert system applied to a particular IT system may, through appropriate monitors, study system load parameters or the like and through the use of the expert system, make estimates of potential faults due to system bottlenecks or the like.

A significant drawback of expert systems, however, is that they are poorly equipped to handle newly encountered problems or situations. In this manner, it is clear that expert systems are limited in their technical capability of resolving novel issues. Instead, expert systems require a complete model of all the events or failures that can occur in the system being modeled.

The present invention is a further progression towards the realization of a fully automated IT management system. In a manner similar to the way in which data mining techniques are applied to predict the behavior of, for instance, the customers in the direct marketing example, the idea of such techniques may be applied to complex IT system models in determining causal relations between IT system components. The system and method of the present invention when implemented determine how the interlinked components influence each other in terms of performance, potentially uncovering unexpected relations among different components of an IT system and automatically creating or updating causal association models of such systems. This is accomplished through the use of association rule induction methods in conjunction with other data mining techniques applied on historical data sets of system state data.

It is clear that with today's increasingly interconnected and complex IT infrastructures and the corresponding increases in maintenance costs of such systems, a system and method for discovering causal relationships between various subsystems and elements of such complex networks in a substantially automated manner is certainly a valuable tool.

It is also an object of the present invention to have an automated means of accumulating the assortment of data that may be analyzed by an appropriate data mining technique such that performance models of complex IT systems based on periodic measurements of predefined performance levels may be generated or updated. Additional description on the collection of monitoring data and application of data mining techniques may be found in Applicants' co-pending patent application, U.S. patent application Ser. No. 09/036, 393, entitled "A System and Method for Generating Performance Models of Complex Information Technology Systems", filed concurrently herewith, which is incorporated herein by reference.

Another desirable feature of an IT system, such as one incorporating the improvements of the present invention, is to reduce the amount of human intervention required for the system to adapt to dynamic system changes. This is preferably accomplished through automation.

It is further desired that the system and method of the present invention analyze system performances with Boolean attributes, i.e., true or false.

SUMMARY OF THE INVENTION

The present invention is directed to a system and method for automatically creating causal association models of complex information technology (IT) systems by use of association rule induction methods, preferably in conjunction with other data mining techniques. System state information is periodically recorded by system monitors placed throughout the IT system. This state information is then stored in a database with the system model.

A model of the IT system environment is developed in terms of system components and relations between them. This model may be defined with any level of detail and does not necessarily have to be complete or consistent.

Thresholds are defined in terms of monitoring events. These thresholds are used to convert the monitored state information from its monitored numeric format to Boolean values. Target components are then selected and an association rules algorithm searches for associations with other components based on the Boolean values obtained from comparisons between monitored state information and associated thresholds. The probability of causal relation between components are indicated by sets of association rules. Causal relations implied by the model may then be confirmed or refuted. Causal relations discovered that are not implied by the model may indicate the model is incomplete. In this manner, the causal relations of the model may be refined to more accurately model the system environment.

BRIEF DESCRIPTION OF THE DRAWINGS

A more complete understanding of the system and method of the present invention may be had by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 3:
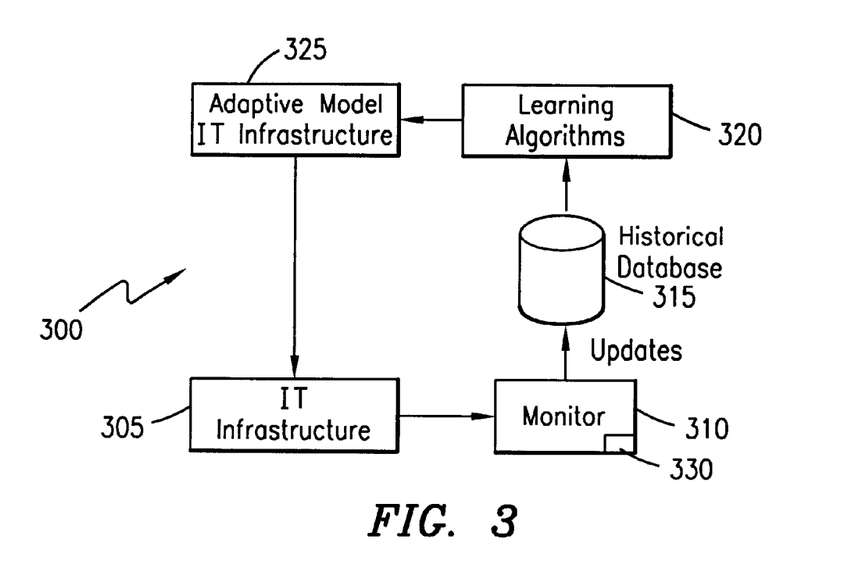
FIG. 3 is a block diagram of a system and method for adaptive system management in accordance with the present invention.

FIG. 3 shows a model of an adaptive system management scenario in accordance with the system and method of the present invention. The application of data mining for causal relations of system components on an information technology (IT) system, designated by the reference numeral 305, is illustrated in FIG. 3, in which the IT system 100/305 is connected to at least one monitor 310 that monitors the performance of the IT system 305. The monitor 310 is connected to a historical database 315, which is used to store various performance measurements on the IT system 100. The historical database 315, in turn, is connected to a number of learning algorithms 320. These learning algorithms uses association rule induction methods well known to those skilled in the data mining community to create causal association models of the IT system. Elements or events relating to the IT system or infrastructure 305 are monitored throughout the system by appropriate monitoring schemes housed within the monitors 310.

Data from the aforementioned monitoring is forwarded by the monitors 310 and input into the historical database 315. The data within the historical database 315, including the newly updated information on the IT system 305 performance is then subjected to an association rules algorithm of the learning algorithms 320. The association rules algorithm 320 may confirm or refute associations in the existing IT system model, or, it may recover associations which are not considered in the model. The learning algorithms 320 then update an adaptive model of the IT infrastructure, designated by the reference numeral 325 by adding, removing, or altering existing modeled associations.

The management environment stores all collected information and uses various learning techniques to learn about the IT system 305 being managed. It should be understood that the aforementioned 'learning' algorithms are well-known to those skilled in the art. These learning techniques enable the management environment to better adapt itself to the IT infrastructure 305 being managed. Further information will then be collected and stored so that the learning process continues. In fact, the entire monitoring, learning, and adapting process provided by the system and method of the present invention is continuous and iterative.

In devising such a dynamic learning model as disclosed in the present invention, it is first necessary to define thresholds for various system performances. These thresholds are required since, when monitoring and recording system state data, numerical data is recovered. This numerical data is ill suited for typical association rules algorithms that are to be utilized in the present invention. By defining thresholds for each specific set of monitored data, the numerical nature of the monitored data is converted to a Boolean value by simple comparison between the monitored data and its corresponding threshold.

As an example of such a threshold, consider the exemplary IT system depicted in FIG. 1 on which the present invention may find application. Database 105, also denoted herein by the reference identifier A, is resident on a server 110 such that numerous and diverse users may query the database 105. In querying such a database, it is reasonable that a login must be first performed. This login may conventionally be performed through another database, in this example database 115, also referred to herein as database B.

Therefore, for a system user, such as at a remote computer 140, to remotely query database A, login is executed through database B, which upon a successful login grants a user rights to query database A. For this entire operation, a threshold may be established by knowledgeable management personnel, designated in FIG. 2 by the reference numeral 230. Typically, such a threshold would be formed with knowledge of the server performances on which databases A and B reside and a general knowledge of data traffic through these servers.

In the example depicted in FIG. 1, for instance, such a query may be executed from computer 140 or another computer 145. Therefore, an obvious effect of such a query would be on the performance of a hub element 135. However, in such a network, a number of elements may often exist that could unknowingly effect system performance, such as the database query of the ongoing discussion, a network printer 165, another printer 155, a server 160 or any of a wide variety of system hardware resources or software applications running on system 100. A further discussion of potential deleterious effects within a network, such as shown in FIG. 1, may be found in Applicants' aforementioned co-pending patent application.

For the aforementioned database query example, assume the startup time of database A is a reasonable measure of the performance of database A. Therefore, the targeted performance level of database A, or a performance threshold, could be constructed from the access times of databases A and B. Since access time has been assumed to be a good measure of performance of such an application, total access time for database A may include the access time of database B since effective execution of database A is prolonged by the execution of database B. For this case, the total access time, $(AT)_{AB}$, for startup of database A may be found from the sum of the startup times of the individual databases, $AT_A$ and $AT_B$, in other words, $$(AT)_{AB} = AT_A + AT_B$$

Assume that study of the individual applications and hardware from which execution of these applications are executed indicates that it is reasonable for execution of database B to take place in no more than 1 second and subsequent execution of database A in no more than 2 seconds. From this information, the target for total startup time of database A, $(AT)_{AB}$, would be for execution of A in no longer than 3 seconds. This threshold (TH) would appropriately be recorded as:

$$TH_{AB} \leq 3\_seconds$$

This threshold would indicate, in a Boolean format, that execution of database A in a time of less than or equal to 3 seconds is satisfactory and an execution time exceeding 3 seconds is unsatisfactory and may be recorded in a form similar to the following:

If\_access\_time\_of\_A$\leq TH_{AB} \rightarrow$A\_performance\_is\_good

Else$\rightarrow$A\_performance\_is\_poor

The previous example utilizes a defined threshold, $TH_{AB}$. However, some thresholds may not be defined but rather discovered. As an example of such a threshold, consider a monitor that collects (counts) the number of disk accesses to a specific hard drive. Often times, the total number of disk accesses may be of little or no value, i.e., resetting of the monitor counter may yield the monitored values useless. However, the average number of disk accesses per unit time may be very valuable. The numeric value of the cumulative disk accesses may be converted to a useful Boolean attribute in a manner similar to the previous example where the Boolean value would indicate a load above or below the component's average load. For the monitor of the current example, herein denoted monitor$_Y$, the conversion to a Boolean value would be given according to the following logical expression:

If\_Monitor$_Y$>TH(Average\_Monitor$_Y$)$\rightarrow$then (Higher\_than\_average)$_Y$=True Else$\rightarrow$(Higher\_than\_average)$_Y$=False Here, (Higher\_than\_average)$_Y$ is a Boolean value describing the load on component Y. In evaluating this value, it would not be necessary to define a threshold, as the average value of component Y, (Average\_Monitor$_Y$), serves as a threshold and is determined by the historical values of loads on component Y. Thus, monitored component state data may be converted to Boolean values by the use of either defined or discovered thresholds. In this way, every monitored component state is able to be described as either in a high or low state. Furthermore, it should be noted that thresholds may be static, i.e., $TH_{AB}$, or dynamic, i.e., TH(Average\_Monitor$_Y$).

In order to apply the aforementioned data mining techniques and association rules algorithms to historical data on the IT system 305, it is first necessary to build the aforementioned historical database 315. It has been determined that the most advantageous method of storing such data is in a relational database. Furthermore, each monitor 310 may or may not have its own local memory. Typically, all monitored data would be directed to one central storage location. However, this is not a necessity. Such data could possibly be stored locally at a respective monitor 310 and then later sent to a central database where data mining applications may be used to analyze the data.

Data monitors 310 may be placed throughout the IT infrastructure 305 at various components within the system. Monitoring activity may be directed to any number of components with, in general, the overall effectiveness of the present invention enhanced with a corresponding increase in the number of monitors 310 being utilized. These monitors 310 preferably perform their specific monitoring activity automatically and at specific time intervals. The type of data being monitored and stored in the historical database 315 may be generally described as state or usage information on a component level, i.e., a harddisk, database, or a network segment. For instance, a monitor 310 used to monitor and record historical data on a particular harddisk may record free capacity of the disk and whether the disk is being accessed or not. Similar data collected from monitoring a database may include the number of users accessing the database, query volume, and access time.

Figure 4:
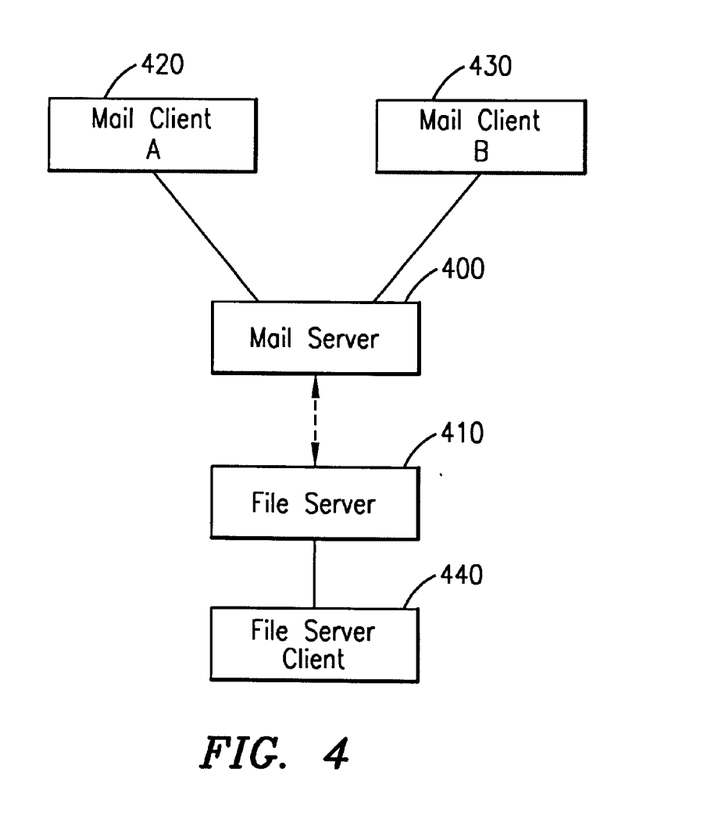
FIG. 4 is a schematic diagram illustrating causal modeling between two simple elements within an IT system.

A final input to be considered is the original system model. The model of the IT system 305 should be developed in terms of system components and relations between these components. A better understanding of development of such a model may be had with reference to FIG. 4. This figure depicts a simplified example relationship between two common IT system components, a Mail Server 400 and File Server 410, and respective clients 420, 430 and 440, attached thereto. The original model is derived from expected interactions among such components. From inspection of FIG. 4, the following relations would likely be expected and would therefore be included in the original system model:

mail\_server\_down$\Rightarrow$client\_mail\_not\_readable

File\_server\_down$\rightarrow$File\_server\_client\_response\_unacceptable It should be apparent to those skilled in the art that the exact modeling technique is inconsequential, as any number of algorithmic languages may be used in development of such a model.

Using the model, monitored component and system state information, and the Boolean values obtained from the thresholds and monitored data as input into the association rules induction algorithm, the algorithm searches for relations among system state data by techniques well known to those in the data mining community. These relations are then compared to expected relations as predicted by the current system model given identical system state input. In this manner, causal relationships in the model can be confirmed or refuted, allowing the model to be updated to more accurately model the real IT system.

In the previous example in connection with FIG. 4, for instance, the association rules algorithm may discover over some time that client mail at Mail Client 420 or another Mail Client 430 is not readable whenever the File Server 410 is down. This would indicate that the Mail Server 400 and File Server 410 are not independent elements. In this case, the following rules or their equivalent, would be generated from the association rules induction algorithm:

File_server_down→Mail_server_down

File_server_down→client_mail_not_readable

The model would then be updated, either by an administrator or automatically, to reflect their newly discovered causal relations between the Mail Server 400 and File Server 410 services.

It should be obvious that the above example is an idealized and simplistic example. Typically, causal relations among various components would not be so discrete but instead would be determined to have complex probability relations among one another. These types of relations are often expressed with relative 'weights' among each other. In such, the model may not be adapted by simply removing or adding causal relations. Often, new information that is discovered may relate to thresholds existing between components. In the previous example, a threshold may be determined such that when the Mail Server 400 is serving X number of clients during a period of time, there is a probability Y of the File Server 410 failing. New information uncovered relating to the causal relation between the Mail Server 400 and File Servers 410 of the current example may simply be to adjust the threshold of the Mail Server 400 load, X, at which performance of the File Server 410 begins to become faulty.

In general, association rules algorithms work only with binary values. Of consequence is the necessity of converting monitored values into binary values. This is accomplished per the previously discussed thresholds and conversion techniques. These Boolean values are then used as descriptors for system component states to be input into the association rules algorithm. The Boolean values are simply used to describe the monitored state of components. It is these Boolean values that allow the use of such association rules algorithms. In general, the association rules algorithm verifies or refutes causal association rules of the model, where such rules have the following general form:

Monitor A (antecedent)→Monitor B (consequent) (confidence x%, support y%)

Here, the antecedent and consequent are simply characterizations describing the states of the respective monitors. The confidence is the probability that the consequent is true given that the antecedent is true. Support is the percentage of cases within the total data set for which the rule is found to be true.

In the example of the Mail Server 400 and File Server 410 depicted in FIG. 4, the input to the association rules algorithm consisted of the historical data set of historical system component state data, thresholds relating to component state data, and the system component relations that would currently reside in the system model. These modeled relations for this specific example are again given below:

mail_server_down→client_mail_not_readable

File_server_down→File_server_client_response_unacceptable

If a system administrator determined that the system model did not accurately reflect system components' effect on, for instance, the Mail Server 400 in FIG. 4, the administrator may select the Mail Server 400 as a target component to be analyzed by the system and method of the present invention. The historical database of system component state data and this data's associated thresholds would then be analyzed by techniques known to those skilled in the art, e.g., through analysis of decision nodes of decision trees as described in more detail in Applicants' copending patent application. Components with apparent interactions with the Mail Server 400 would be identified. The components thresholds are then used to convert the numerical state data to Boolean attributes describing such states. The system component state data, now described with discrete Boolean attributes, are then input into an association rules algorithm to search for causal relations on the target component, which is the Mail Server 400 in this example.

The output of the process would be a new set of associations between the target component and other components. The output may be manifested in a number of ways. In the preferred embodiment of the present invention, a initial set of association rules is generated. These rules are then compared to the association rules in the model. In this way, common algorithm coding techniques can render the output process substantially automatically. Results of the comparison between the discovered set of association rules and those rules in the model would have two possible outcomes: association rules discovered that are coincident with those rules in the model and association rules discovered that are not included in the model. Therefore causal relations not known or implied by the model would be determined in a new set of association rules output by the association rules algorithm, and, association rules discovered that were implied by the model would give further corroboration by the association rules algorithm output. In the example of FIG. 4, possible association rules that may be discovered by the association rules algorithm include the following:

mail_server_down→client_mail_not_readable

File_server_down→File_server_client_response_unacceptable

File_server_down→Mail_server_down

File_server_down→client_mail_not_readable

The first two association rules output are noted to be coincident with those association rules of the model. However, the last two association rules are not included in the model.

The system and method of the present invention may be realized in an automated fashion by having the newly discovered association rules automatically added to the model by means of appropriate coding techniques. However, such an automated means may not be desirable. In such a case, the newly discovered association rules that are not included in the model may be output to a system administrator to observe or verify before the model is altered.

The benefits of such a system and method as disclosed in the present invention are numerous. The development of association rules between components in a complex IT system utilizing data mining and association rules induction methods would greatly reduce the man hours required in detecting fault causes in such a system. Another obvious benefit would be the verification of a system model. System models would be able to be verified for accuracy and completeness. Unknown interdependencies between system components may be discovered thus allowing administrators to take appropriate actions to increase system performance. An additional benefit is seen to be that the system model need not be complete or precise, as over time, incomplete or erroneous component associations may be accounted for, thus allowing the model to be adjusted to more accurately reflect relations among components of the system.

Throughout the discussion of the present invention, consideration has been given to essentially two system components and the discovery of causal relations between them. It should be apparent that the described system was provided for simplification of discussion and that the present invention would find implementation on a vast array of system architectures and complexities, with components numbering in the hundreds, or even thousands.

As discussed, further description on additional features of the preferred embodiments of the present invention may be found in Applicants' co-pending patent application, incorporated herein by reference.

Although a preferred embodiment of the system and method of the present invention has been illustrated in the accompanying drawings and described in the foregoing detailed description, as well as in Applicants' aforementioned co-pending patent application, it will be understood that the invention is not limited to the embodiment disclosed, but is capable of numerous rearrangements, modifications and substitutions without departing from the spirit of the invention as set forth and defined by the following claims.

What is claimed is:

1. In an information technology system having a multiplicity of interconnected nodes, a method for modeling the performance of said system, said method comprising the steps of:
    (a) in an interactive manner, continuously monitoring, at a plurality of said nodes, the performance of said system;
    (b) in an automated manner, continuously collecting, at said plurality of nodes, performance data for said system over a given time period;
    (c) determining, from said performance data of said system, a plurality of causal relationships between a multiplicity of said interconnected nodes within said system;
    (d) comparing said plurality of causal relationships within said system with an adaptive model of said system, said adaptive system model modeling a portion of said information technology system; and
    (e) in an automated manner, updating said adaptive system model according to newly discovered causal relationships.

2. The method according to claim 1, further comprising after said step of comparing, the step of:
    (e) modifying said system model.

3. The method according to claim 1, further comprising the step of:
    repeating steps (a)–(e) a plurality of times, said collecting step continuously collecting said performance data over other time periods.

4. The method according to claim 1, further comprising the step of:
    repeating steps (a)–(d) a plurality of times, said collecting step continuously collecting said performance data over other time periods.

5. The method according to claim 1, wherein if, after said step of comparing, at least one of said causal relationships fails to match said adaptive system model, adding said at least one causal relationship to said adaptive system model.

6. The method according to claim 1, wherein if, after said step of comparing, said plurality of causal relationships fail to match said adaptive system model, alerting a system administrator of said failure.

7. The method according to claim 1, further comprising, prior to step (a), the step of:
    running a test program to define a performance threshold within said system; and
    determining said plurality of nodes associated with said performance threshold.

8. The method according to claim 7, wherein said target component is selected from the group consisting of a system hardware resource, a system software application and a service level agreement.

9. The method according to claim 1, further comprising, prior to said step of comparing, generating said adaptive system model.

10. The method according to claim 9, wherein said adaptive system model is generated from the selection of a target component within said system to model, a plurality of said causal relationships determining a plurality of model nodes within said adaptive system model associated with said target component.

11. The method according to claim 10, wherein said target component is selected from the group consisting of a system hardware resource, a system software application and a service level agreement.

12. The method according to claim 1, wherein said performance data in said step of continuously collecting is automatically collected periodically over said given time period.

13. The method according to claim 12, wherein said given time period for continuously collecting said performance data is selected from the group consisting of days, hours, minutes and seconds.

14. The method according to claim 1, further comprising, after said step of continuously collecting and prior to said step of determining, the step of:
    storing said performance data.

15. The method according to claim 14, wherein said performance data is stored with an associated time stamp.

16. The method according to claim 15, wherein said performance data and associated time stamp are stored in a relational database.

17. The method according to claim 16, wherein said adaptive system model is stored in said relational database.

18. The method according to claim 1, wherein said performance data in said step of continuously collecting is selected from the group consisting of real numbers, integers and Booleans.

19. The method according to claim 1, wherein said performance data in said step of continuously collecting is converted to a plurality of Boolean values.

20. The method according to claim 19, wherein said plurality of Boolean values correspond to a plurality of performance threshold conditions.

21. The method according to claim 20, wherein said performance threshold conditions are predetermined.

22. The method according to claim 20, wherein said performance threshold conditions are variable.

23. The method according to claim 19, wherein said performance data is converted to a plurality of Boolean values by use of predetermined thresholds.

24. The method according to claim 19, wherein said performance data is converted to a plurality of Boolean values by use of newly discovered thresholds.

25. The method according to claim 1, wherein said performance data in said step of continuously collecting is averaged over said given time period.

26. The method according to claim 25, wherein said averaged performance data is converted to at least one Boolean value.

27. The method according to claim 26, wherein said at least one Boolean value corresponds to at least one service level agreement within said system.

28. A program storage device readable by a machine and encoding a program of instructions for executing the method steps of claim 1.

29. An information technology system having a multiplicity of interconnected nodes, said system comprising:
   an iterative monitor means for continuously monitoring, at a plurality of said nodes, the performance of said system at the respective nodes;
   an automated collection means for continuously collecting, at said plurality of said nodes, performance data for said system over a given time period;
   determining means for determining, from said performance data of said system, a plurality of causal relationships between a multiplicity of said interconnected nodes within said system;
   comparison means for comparing said plurality of causal relationships within said system with an adaptive model of said system, said adaptive system model modeling a portion of said information technology system; and
   an automated updating means for updating said adaptive system model according to newly discovered causal relations after the comparison by said comparison means.

30. The system according to claim 29, further comprising:
   modification means for modifying said system model after the comparison by said comparison means.

31. The system according to claim 29, wherein said iterative monitor means continuously monitors system performance at another plurality of nodes, said automated collection means continuously collects other performance data for said system over another time period, said determining means determines from said other performance data another plurality of causal relationships between another multiplicity of said interconnected nodes within said system, said comparison means compares said another plurality of causal relationships with said adaptive system model, and said automated updating means further updating said adaptive system model.

32. The system according to claim 29, wherein if said comparison means fails to match at least one of said causal relationships with said adaptive system model, said automated updating means adds said at least one causal relationship to said adaptive system model.

33. The system according to claim 29, further comprising:
   alerting means for alerting a system administrator if said plurality of causal relationships fail to match said adaptive system model.

34. The system according to claim 29, further comprising:
   testing means for running a test program to define a performance threshold within said system, said testing means determining said plurality of said nodes associated with said performance threshold.

35. The system according to claim 34, wherein said target component is selected from the group consisting of a system hardware resource, a system software application and a service level agreement.

36. The system according to claim 29, further comprising:
   model generation means for generating said adaptive system model.

37. The system according to claim 36, wherein said model generation means selects a target component within said system to model, a plurality of said causal relationships determining a plurality of model nodes within said adaptive system model associated with said target component.

38. The system according to claim 37, wherein said target component is selected from the group consisting of a system hardware resource, a system software application and a service level agreement.

39. The system according to claim 29, wherein said automated collection means continuously collects said performance data periodically over said given time period.

40. The system according to claim 39, wherein said given time period for continuously collecting said performance data is selected from the group consisting of days, hours, minutes and seconds.

41. The system according to claim 29, further comprising:
   storage means for storing said performance data continuously collected by said automated collection means.

42. The system according to claim 41, wherein said performance data is stored with an associated time stamp.

43. The system according to claim 42, wherein said storage means is a relational database.

44. The system according to claim 43, wherein said adaptive system model is stored in said relational database.

45. The system according to claim 29, wherein said performance data continuously collected by said automated collection means is selected from the group consisting of real numbers, integers and Booleans.

46. The system according to claim 29, wherein said performance data continuously collected by said automated collection means is converted to a plurality of Boolean values.

47. The system according to claim 46, wherein said plurality of Boolean values correspond to a plurality of performance threshold conditions.

48. The system according to claim 47, wherein said performance threshold conditions are predetermined.

49. The system according to claim 47, wherein said performance threshold conditions are variable.

50. The system according to claim 46, wherein said performance data is converted to a plurality of Boolean values by use of predetermined thresholds.

51. The system according to claim 46, wherein said performance data is converted to a plurality of Boolean values by use of newly discovered thresholds.

52. The system according to claim 29, wherein said performance data continuously collected by said automated collection means is averaged over said given time period.

53. The system according to claim 52, wherein said averaged performance data is converted to at least one Boolean value.

54. The system according to claim 53, wherein said at least one Boolean value corresponds to at least one service level agreement within said system.

55. An article of manufacture comprising a computer usable medium having computer readable program code means embodied thereon for modeling the performance of an information technology system having a multiplicity of interconnected nodes, the computer readable program code means in said article of manufacture comprising:
   computer readable program code means, executed by the computer, for performing steps for:

(a) in an iterative manner, continuously monitoring, at a plurality of said nodes, the performance of said system;
(b) in an automated manner, continuously collecting, at said plurality of nodes, performance data for said system over a given time period;
(c) determining, from said performance data of said system, a plurality of causal relationships between a multiplicity of said interconnected nodes within said system;
(d) comparing said plurality of causal relationships within said system with an adaptive model of said system, said adaptive system model modeling a portion of said information technology system; and
(e) in an automated manner, updating said adaptive system model according to newly discovered causal relationships.

* * * * *

UNITED STATES PATENT AND TRADEMARK OFFICE
CERTIFICATE OF CORRECTION

PATENT NO. : 6,393,387 B1
DATED : May 21, 2002
INVENTOR(S) : Pieter Willem Adriaans et al.

It is certified that error appears in the above-identified patent and that said Letters Patent is hereby corrected as shown below:

Column 11,
Line 40, replace "interactive manner" with -- iterative manner --
Lines 58-60, delete "The method according to
claim 1, further comprising after
said step of comparing, the step
of:
(e) modifying said system model."

Column 13,
Lines 39-41, delete "The system according to claim
29, further comprising:
modification means for modifying said
system model after the comparison by
said comparison means."

Signed and Sealed this

Twenty-fifth Day of November, 2003

JAMES E. ROGAN
*Director of the United States Patent and Trademark Office*